(12) United States Patent
Yamamoto (10) Patent No.: US 8,303,117 B2
(45) Date of Patent: Nov. 6, 2012

(54) PROJECTION OPTICAL SYSTEM AND PROJECTION-TYPE DISPLAY APPARATUS USING THE SAME

(75) Inventor: Chikara Yamamoto, Saitama (JP)

(73) Assignee: Fujifilm Corporation, Tokyo (JP)

( * ) Notice: Subject to any disclaimer, the term of this patent is extended or adjusted under 35 U.S.C. 154(b) by 247 days.

(21) Appl. No.: 12/797,089

(22) Filed: Jun. 9, 2010

(65) Prior Publication Data

US 2010/0315598 A1 Dec. 16, 2010

(30) Foreign Application Priority Data

Jun. 16, 2009 (JP) ................ P2009-143689

(51) Int. Cl.
 *G03B 21/14* (2006.01)
(52) U.S. Cl. ........................................... 353/20; 353/31
(58) Field of Classification Search ................ 353/20, 353/31, 38, 81; 359/663, 651, 708; 349/9; 348/742, 743, 771
See application file for complete search history.

(56) References Cited

U.S. PATENT DOCUMENTS

| | | | |
|---|---|---|---|
| 5,552,938 A | 9/1996 | Sugawara | |
| 5,597,222 A * | 1/1997 | Doany et al. | 353/33 |
| 6,172,813 B1 * | 1/2001 | Tadic-Galeb et al. | 359/618 |
| 6,185,041 B1 * | 2/2001 | Tadic-Galeb et al. | 359/618 |
| 6,239,917 B1 * | 5/2001 | Tadic-Galeb et al. | 359/663 |
| 6,746,123 B2 * | 6/2004 | Itoh | 353/20 |
| 6,839,181 B1 * | 1/2005 | Cobb et al. | 359/634 |
| 2010/0053774 A1 * | 3/2010 | Baba et al. | 359/755 |
| 2011/0242685 A1 * | 10/2011 | Yamamoto | 359/786 |
| 2011/0267586 A1 * | 11/2011 | Tsai et al. | 353/20 |
| 2012/0002171 A1 * | 1/2012 | Shiue et al. | 353/20 |

FOREIGN PATENT DOCUMENTS

| | | | |
|---|---|---|---|
| JP | 4-326315 A | 11/1992 | |
| JP | 5-203872 A | 8/1993 | |

* cited by examiner

*Primary Examiner* — William C Dowling
(74) *Attorney, Agent, or Firm* — Birch, Stewart, Kolasch & Birch, LLP (57) ABSTRACT

A projection optical system can achieve compactness and improve a state where polarized rays are separated by a polarized light separation section, without a separate optical system which makes the whole system telecentric, by using a reflective light valve. The projection optical system includes, in order, the reflective light valve, a projection lens and the polarized light separation section. The reflective light valve modulates incident illumination light in response to an input image signal and reflects and emits the modulated light. The projection lens transmits the illumination light incident to the reflective light valve and the modulated light emitted from the reflective light valve and is formed to be telecentric on the reduction side. The polarized light separation section separates the optical path of the illumination light incident to the projection lens from the optical path of the modulated light emitted from the projection lens.

7 Claims, 9 Drawing Sheets

PRESENT EMBODIMENT

FIG. 1

EXAMPLE 1

FIG. 2

EXAMPLE 2

FIG. 3

EXAMPLE 3

FIG. 4

EXAMPLE 4

FIG. 5

EXAMPLE 5

FIG. 6

EXAMPLE 6

FIG. 7

EXAMPLE 7

FIG. 8

EXAMPLE 1

FIG. 11
EXAMPLE 4

FIG. 12
EXAMPLE 5

FIG. 13
EXAMPLE 6

FIG. 14
EXAMPLE 7

FIG. 15

PRESENT EMBODIMENT

FIG. 16

EXAMPLE OF RELATED ART

PROJECTION OPTICAL SYSTEM AND PROJECTION-TYPE DISPLAY APPARATUS USING THE SAME

CROSS-REFERENCE TO RELATED APPLICATIONS

This application is based upon and claims the benefit of priority from the Japanese Patent Application No. 2009-143689 filed on Jun. 16, 2009; the entire contents of which are incorporated herein by reference.

BACKGROUND OF THE INVENTION

1. Field of the Invention

The present invention relates to a projection optical system that projects an image, which is displayed by a reflective light valve, onto a screen in a enlarged manner and the projection-type display apparatus having the same, in particular, to a projection optical system, which has a small size with good mobility and has a light source with a relatively small luminance, and a projection-type display apparatus having the same.

2. Description of the Related Art

Recently, in the projectors, there has been a demand for highly portable mobile projectors.

Among such mobile projectors, there is a convenient projector which is able to project an image onto a desirable location (for example, a wall or a ceiling) while being held in one hand as if using a flashlight or a penlight.

However, there are known reflective light valves that can be mounted on such a projector, such as a reflective liquid crystal display device (a LCOS) and a DMD (a Digital Micro Device). The reflective light valves have an advantage in that it is possible to increase the aperture ratio thereof as compared with that of the transmissive light valve, increase the efficiency of light conversion, and promote compactness of the projector.

On the other hand, generally, a known arrangement of the projection optical system is as follows: a PBS (a polarization beam splitter prism) as a polarized light separation section is disposed between the projection lens and the reflective light valve, the illumination light originating from the light source section is made to be incident to the reflective light valve through the PBS, the optical path of the light modulated by the reflective light valve is separated from the optical path of the illumination light by the PBS, and the modulated light is projected toward the screen by using the projection lens.

However, in such a projection optical system, when the PBS has the incident angle characteristics and the angle of light incident on the polarized light separation surface has a range, the disadvantages such as the luminance unevenness and the color unevenness may arise. For this reason, it is necessary to make the illumination light incident to the PBS in a telecentric state, and thus it is also necessary to adopt a configuration in which the projection lens is formed to be telecentric on the reduction side and then the PBS and the reflective light valve are disposed.

Figure 16:
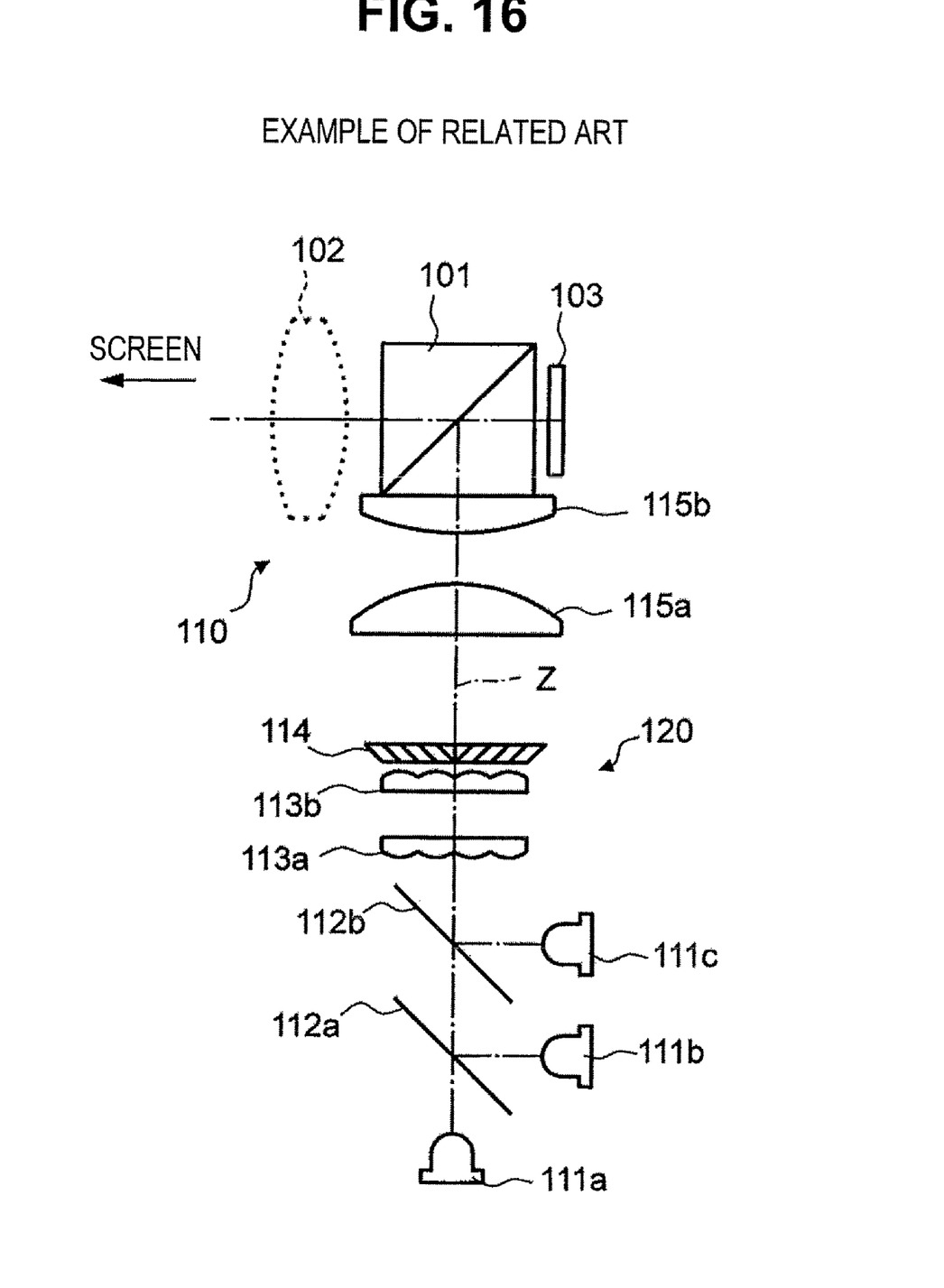
FIG. 16 is a diagram illustrating a schematic configuration of principal parts of the projection-type display apparatus according to an example of the related art.

FIG. 16 shows an example of the projection display apparatus equipped with the projection optical system used in the related art. That is, an illumination optical system 120 includes: three-color. LED light sources 111a to 111c; dichroic mirrors 112a and 112b; fly-eye integrators 113a and 113b that serve as sections that uniformizes the light amount; a comb-like filter 114 that shapes the illumination light into the several linear polarized rays (P-polarized light or S-polarized light); and a pair of field lenses (condenser lenses) 115a and 115b. The illumination light emitted from the illumination optical system 120 is incident to a PBS 101 of a projection optical system 110. The illumination light incident to the PBS 101 is shaped in the predetermined linear polarization direction, and is reflected toward a reflective liquid crystal display device 103 on the polarized light separation surface. Then, in the reflective liquid crystal display device 103, the illumination light is modulated on the basis of a predetermined image signal, and is converted into the linearly polarized light with the opposite phase. Thereafter, the modulated light reflected and emitted from the reflective liquid crystal display device 103 is converted into the linearly polarized light with the opposite phase, is therefore transmitted through the polarized light separation surface of the PBS 101, and is projected onto a screen in an enlarged manner by the projection lens 102.

However, in the example of the related art shown in FIG. 16, as described above, it is necessary to secure the back space into which the PBS can be inserted while the projection lens 102 is formed to be telecentric on the reduction side. Thus, particularly the diameters of the lenses closer to the reduction side in the projection lens increase, and as a result, a problem arises in that it is difficult to achieve compactness in the projection optical system and the projection-type display apparatus. Further, in the example of related art shown in FIG. 16, it is necessary to consider the incident angle characteristics of the polarized light separation surface when the rays emitted from the illumination optical system 120 are incident to the PBS 101. For this reason, the condenser lenses 115a and 115b are necessary in order to make the rays, which are emitted from the illumination optical system 120, telecentric. This causes problems such as an increase in cost and size of the projection optical system.

The projection optical systems disclosed in JP-A-4-326315 and JP-A-5-203872 which are able to achieve compactness of the optical system in consideration of the arrangement of the optical elements in order to cope with the problems mentioned above have been known.

SUMMARY OF THE INVENTION

In the systems disclosed in the JP-A-4-326315 and JP-A-5-203872, the projection lens is separated into two parts with the PBS interposed therebetween, in which one is disposed closer to the screen side of the PBS and the other one is disposed closer to the reflective liquid crystal display device of the PBS.

As described above, since the PBS is disposed on the center portion of the projection lens, it is possible to alleviate the above-mentioned problem of the related art, which is the necessity to secure the back space into which the PBS can be inserted, to a certain extent. Furthermore, since a part of the projection lens is disposed not only on the magnification side of the PBS but also on the reduction side thereof, the configuration may be made in which the optical elements such as the condenser lenses 115a and 115b shown in FIG. 16 are not necessary.

As it is, according to JP-A-4-326315 and JP-A-5-203872, the PBS is disposed in the vicinity of the pupil of the projection lens which is telecentric on the reduction side, and a part of the projection lens is disposed on the magnification side of the PBS. Therefore, it is difficult to say that the increase in size of the projection lens is sufficiently suppressed overall. Furthermore, it is also difficult to sufficiently decrease the size of the projection-type display apparatus including the illumination optical system.

Furthermore, the PBS is disposed between the lens groups of the projection lens. Hence, as described above, the configuration of the projection lens is separated by the PBS into the magnification side and the reduction side. For this reason, as might be expected, it is difficult to perform the assembly work of the projection lens, and thus it is also difficult to secure desirable performance of the lens.

The invention has been made in view of the above-mentioned situation, and it is desirable to provide a high-optical-performance projection optical system capable of achieving compactness and improving the state in which the polarized rays are separated by the polarized light separation section, without providing a separate optical system which makes the whole system telecentric, by using a reflective light valve. In addition, it is also desirable to provide a projection-type optical apparatus using the same.

According to a first embodiment of the invention, a projection optical system includes, in order, a reflective light value, a projection lens, and a polarized light separation section. The reflective light valve modulates incident illumination light in response to an input image signal and reflects and emits the modulated light. The projection lens transmits the illumination light incident to the reflective light valve and the modulated light emitted from the reflective light valve and is formed to be telecentric on a reduction side. The polarized light separation section separates the optical path of the illumination light incident to the projection lens from the optical path of the modulated light emitted from the projection lens.

Further, the projection lens may satisfy the following conditional expression (1):

$$-1.0 < FF/f < 1.0 \quad (1),$$

where

FF is the focal position of the projection lens on the magnification side when the vertex of the magnification side surface of the lens closest to the magnification side of the projection lens is defined as the point of origin and a direction toward the reduction side is defined as the positive direction, and f is the focal length of the projection lens.

Furthermore, the number of the reflective light valve may be one. The following conditional expression (2) may be further satisfied:

$$Bf/f < 0.8 \quad (2),$$

where

Bf is a back focal length of the projection lens on the reduction side, and f is a focal length of the projection lens.

Further, the projection lens may be formed of four or fewer lenses.

Furthermore, at least one surface of the lens, which is disposed to be closest to the reduction side of the projections lens, may be formed to be aspheric.

Further, a maximum value of a diameter of effective rays among rays, which are transmitted through each lens constituting the projection lens, in a direction perpendicular to an optical axis may be 15 mm or less.

According to a second embodiment of the invention, a projection-type display apparatus includes the above-mentioned projection optical system according to the first embodiment and an illumination optical system. The illumination optical system emits illumination light and uniformizes a light amount of the illumination light.

In the projection optical system according to the embodiment of the invention, first the illumination light is incident to the polarized light separation section, then passes through the entire length of the projection lens, and is irradiated to the reflective light valve. On the other hand, the modulated light (the projected light) is transmitted through the entire length thereof so as to be reflected and emitted from the reflective light valve and return to the projection lens. Subsequently, in the polarized light separation section, the light is separated from the optical path of the illumination light, and is projected toward the screen. As described above, in the projection optical system according to the embodiment of the invention, the polarized light separation section is positioned to be closer to the magnification side (the screen side) of the entire projection lens, and thus it is possible to reduce the back portion of the whole lens. If the back portion of the whole lens can be reduced, it is possible to reduce the diameter of the lens closer to the reduction side of the projection lens which is formed to be telecentric on the lens back side. Therefore, it is possible to achieve compactness of the projection optical system and the projection-type display apparatus having the same. Furthermore, the illumination light emitted from the illumination optical system is made to be telecentric by using the projection optical system. Therefore, it is not necessary to provide the separate lenses 115a and 115b as shown in FIG. 16. In addition, it is possible to promote compactness of the projection optical system and the projection-type optical apparatus.

Thereby, by using the reflective light valve capable of achieving compactness of the apparatus configuration, the projection-type display apparatus may be made to be compact such that the entire apparatus can be held by one hand as if using a flashlight or penlight.

Furthermore, when the projection optical system according to the embodiment of the invention is configured to satisfy the conditional expression (1), it becomes easy to set the position of the front side pupil of the projection lens on the lens closest to the magnification side in the projection lens and in the range from the lens to the polarized light separation section. Therefore, it is possible to improve the polarization separation characteristics of the polarized light separation section while reducing the diameter of the lens closer to the reduction side in the projection lens.

DESCRIPTION OF THE PREFERRED EMBODIMENTS

Hereinafter, the embodiment of the invention will be described with reference to the accompanying drawings.

Figure 15:
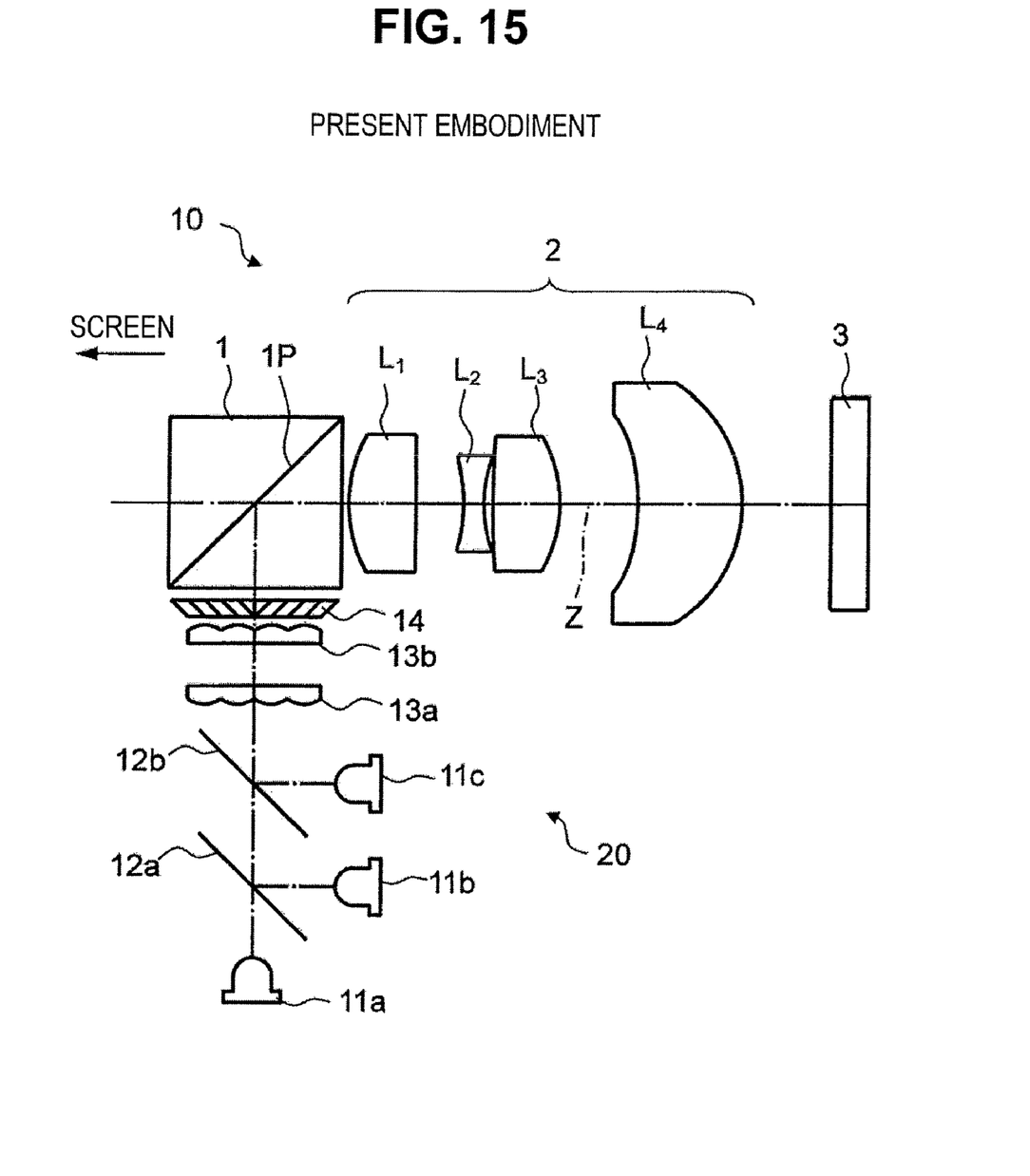
FIG. 15 is a diagram illustrating a schematic configuration of the principal parts of the projection-type display apparatus according to an embodiment of the invention.

FIG. 15 is a schematic diagram illustrating a projection-type display apparatus according to an embodiment of the invention. The apparatus has the illumination optical system 20 and the projection optical system 10. The illumination optical system 20 includes: three-color LED light sources 11a to 11c; dichroic mirrors 12a and 12b that synthesizes respective illumination rays emitted from the light sources 11a to 11c; fly-eye integrators 13a and 13b that serves as sections that uniformizes the light amount; and a polarization conversion element (a comb-like filter) 14 that changes any one polarization state of two linearly polarized rays, of which oscillation planes are orthogonal to each other, to the other one polarization state of them and emits the rays. The projection optical system 10 includes: a polarization separation prism (a PBS: hereinafter the same) 1 that serves as a polarized light separation section; a projection lens 2 that is formed of a plurality of lenses ($L_1$ to $L_4$); and a reflective liquid crystal display device (LCOS: hereinafter the same) 3.

Specifically, the illumination optical system 20 is a generally known illumination optical system that outputs the predetermined linearly polarized light by synthesizing the three-color rays of R, G, and B. In the system, the polarization direction of the predetermined linearly polarized light is set so that the light is reflected by approximately 100% on a polarized light separation surface 1P of the PBS 1.

Furthermore, the projection optical system 10 is characterized so that the PBS 1, the projection lens 2 and the LCOS 3 are arranged as described above. That is, the illumination light originated from the illumination optical system 20 is reflected by the PBS 1, and passes through the entire length of the projection lens 2 so as to be irradiated onto the LCOS 3. Then, the illumination light is modulated by the LCOS 3 and converted into the linearly polarized light with the opposite phase (the phase of the linearly polarized light is rotated by 180 degrees). Since the phase of the linearly polarized state of the modulated light is converted into the opposite phase, the light is reflected and emitted from the LCOS 3, passes through the entire length of the projection lens 2, is subsequently transmitted through the polarized light separation surface 1P of the PBS 1, and is projected onto a screen which is not shown. Furthermore, the modulation of the illumination light in the LCOS 3 is performed on the basis of the input predetermined image signal. Thereby, the image information carried by the modulated light is projected onto the screen in an enlarged manner.

As described above, in the projection optical system according to the embodiment, first the illumination light is incident to the PBS 1, then passes the projection lens 2, and is irradiated onto the LCOS 3. On the other hand, the modulated light is reflected and emitted from the LCOS 3, passes the projection lens 2, is separated from the optical path of the illumination light by the PBS 1, and travels toward the screen. Accordingly, in the projection optical system according to the embodiment, the PBS 1 is positioned to be closer to the magnification side (the screen side) of the entire projection lens 2, and thus it is possible to shorten the distance between the projection lens 2 and the LCOS 3. If the distance can be shortened, it is possible to reduce the diameter of the lens $L_4$ closer to the reduction side in the projection lens 2 while making the projection lens 2 telecentric at the back portion thereof on the reduction side. With such a configuration, it is possible to achieve compactness of the projection optical system and the projection-type display apparatus having the same.

Furthermore, it is preferable that the projection optical system 10 should satisfy the following conditional expression (1).

$$-1.0 < FF/f < 1.0 \tag{1}$$

where

FF is the focal position of the projection lens 2 on the magnification side (the vertex of the magnification side surface of the lens $L_1$ closest to the magnification side of the projection lens 2 is defined as the point of origin, and the direction toward the reduction side is defined as the positive direction), and f is the focal length of the projection lens 2.

Specifically, by satisfying the conditional expression (1), it becomes easy to set the position of the magnification side pupil of the projection lens 2 on the lens $L_1$ closest to the magnification side in the projection 2 and in the vicinity of the range from the lens $L_1$ to the PBS 1. Therefore, it is possible to improve the polarization separation characteristics of the PBS 1 while reducing the diameter of the lens $L_4$ closest to the reduction side in the projection lens 2. More specifically, the focal position of the projection lens, which is telecentric on the reduction side, on the magnification side is set near the PBS 1. In such a manner, the illumination light to the pixels of the reflective light valve and the projected light from the pixels of the reflective light valve are changed into substantially parallel rays in the PBS. Hence, it is possible to maintain the polarization separation characteristics in which the polarized light is uniformly separated in a certain angular range.

In addition, in such a manner, it is possible to suppress occurrence of the luminance unevenness and the color unevenness in the screen. Further, by setting the magnification side focal position of the projection lens, which is telecentric on the reduction side, the near the PBS 1, the PBS having a high cost and a large weight can be disposed on the portion in which rays are maximally collected and the effective ray area becomes smaller, and the PBS can be made to have a small size. Therefore, it is possible to reduce cost and weight.

When the range of the conditional expression is exceeded, the diameter of the lens closer to the reduction side of the projection lens increases, and the polarization separation characteristics in the PBS 1 are deteriorated.

From this point of view, it is preferable that, instead of the conditional expression (1), the following conditional expression (1') should be satisfied.

$$-0.5 < FF/f < 0.6 \tag{1'}$$

Further, it is more preferable that, instead of the conditional expression (1'), the following conditional expression (1") should be satisfied.

$$-0.25 < FF/f < 0.45 \tag{1"}$$

Furthermore, in the projection optical system 10, it is preferable that the number of the LCOS 3 should be one (a single plate) and the following conditional expression (2) should be further satisfied.

$$Bf/f < 0.8 \qquad (2),$$

where

Bf is the back focal length of the projection lens 2 on the reduction side.

When the LCOS 3 is formed as a single plate, it is not necessary to insert the color synthesis optical system between the projection lens 2 and the LCOS 3, and it becomes easy to satisfy the range of the conditional expression (2). In addition, in practice, by satisfying the range, it is possible to achieve compactness of the projection optical system.

From this point of view, in consideration of workability in assembly of the optical system, it is more preferable that, instead of the conditional expression (2), the following conditional expression (2') should be satisfied.

$$0.05 < Bf/f < 0.50 \qquad (2')$$

Furthermore, in the case of the mobile projector having excellent portability, compactness achieved by suppressing the number of lenses is necessary, and thus it is preferable that the number of components of the projection lens 2 should be four or fewer. That is, practically, it is preferable that the number of components should be four (refer to Example 1), three (refer to Examples 2, 3, 4, and 5), or two (refer to Examples 6 and 7).

Further, it is preferable that at least one surface (in FIG. 15, both surfaces of the lens $L_4$) of a lens, which is disposed to be closest to the reduction side of the projections lens 2, should be formed to be aspheric. With such a configuration, it is possible to improve aberration correction of distortion, particularly important for the projection optical system. Furthermore, in order to correct the various aberrations as satisfactorily as possible with a small number of lenses, it is preferable that at least one lens of other lenses should be formed as an aspheric lens.

Furthermore, it is preferable that the maximum value of the diameter of the effective rays among rays, which are transmitted through each lens ($L_1$ to $L_4$ in FIG. 15) constituting the projection lens 2, in the direction perpendicular to the optical axis Z should be 15 mm or less.

That is, in the embodiment, it is preferable to use a small-sized projector capable of securing the maximum value of the effective ray diameter of 15 mm or less as described above and, for example, securing the luminance (which is brighter by an amount of 1/10 to 1/100 than the luminance of the general projector) of around 100 lumens (more preferably 10 lumens).

As described above, the embodiment has a lot of advantages by disposing the PBS 1 on the magnification side (the screen side) of the projection lens 2, while a problem arises in that thermal distortion of the projection tends to be caused by transmitting the rays twice through the projection lens 2. However, the main use of the embodiment is, as described above, that near distance projection is performed by using the small-sized mobile projector having excellent portability. Hence, the inventors of the present invention found that, for such a use, the projector has only to secure, for example, the luminance of 100 lumens, and thus the thermal distortion is scarcely caused even when the rays travel through the projection lens 2 and return back therethrough. On the basis of this finding, the invention has been made. Accordingly, the projection-type optical apparatus according to the embodiment of the invention can be effectively applied to such a small-sized projector.

EXAMPLES

Hereinafter, specific examples of the projection lens according to the embodiment of the invention will be described. Further, in the case where common elements exist in the following examples, those elements will be referenced by the same reference numerals and signs.

Example 1

Four-Element Configuration

Figure 1:
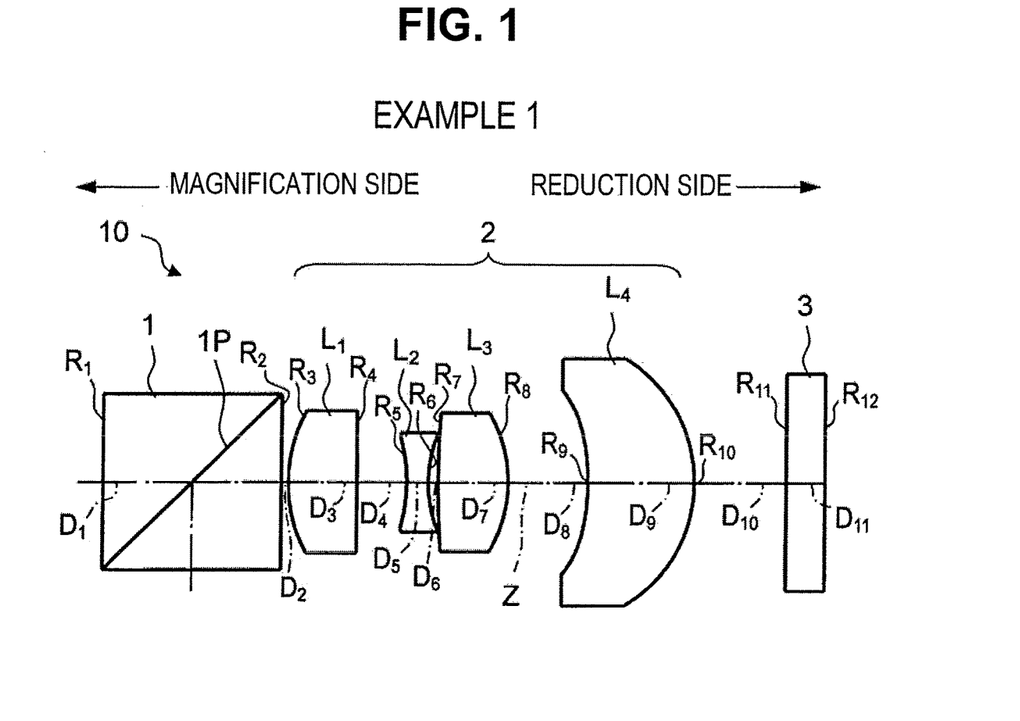
FIG. 1 is a diagram illustrating a configuration of a projection optical system according to Example 1 of the invention.

As shown in FIG. 1, a projection optical system according to Example 1 includes, in order from the magnification side: a first lens $L_1$ formed of a PBS 1 and a biconvex lens; a second lens $L_2$ formed as a biconcave lens; a third lens $L_3$ formed as a biconvex lens; a fourth lens $L_4$ formed as a bi-aspheric lens having a positive meniscus shape which has a convex surface facing toward the reduction side on the optical axis Z; and a LCOS 3. Furthermore, the four lenses $L_1$ to $L_4$ constitute a projection lens 2.

With such a configuration according to the example, it is possible to embody a compact and higher-performance optical system.

Furthermore, the aspheric shapes of the both surfaces of the fourth lens $L_4$ are defined by the following aspheric surface expression.

$$Z = \frac{Y^2/R}{1 + \sqrt{1 - K \times Y^2/R^2}} + \sum_{i=3}^{12} A_i Y^i \qquad \text{Numerical Expression 1}$$

where

Z is the length of a perpendicular from the point on the aspheric surface, which is apart from the optical axis at the distance Y, to the tangential plane (the plane perpendicular to the optical axis) of the vertex of the aspheric surface, Y is the distance from the optical axis, R is the radius of curvature near the optical axis of the aspheric surface, K is the eccentricity, and $A_i$ is the aspheric coefficient (i=3 to 12).

The upper part of Table 1 shows the radius of curvatures R of the lens surfaces of the projection lens system according to Example 1, the center thicknesses of the lenses and air spaces between the lenses D (hereinafter referred to as "on-axis surface spacings"), the refractive indices Nd of the lenses at the d-line, and the Abbe numbers vd of the lenses at the d-line. Furthermore, in Table 1 and the following tables, each numeral of the surface numbers represents the order from the magnification side, and each surface having the reference sign * attached to the right side of each surface number is an aspheric surface. Further, the surface numbers 1 and 2 of Table 1 represents the both surface of the PBS 1. Furthermore, the lower part of Table 1 shows the aspheric surface coefficients representing the aspheric surfaces. Further, in Table 1, the OBJ represents the position of the screen which is not shown (the same in the following Tables 2 to 7). Furthermore, in Table 1, the first and second surfaces represent both surfaces of the PBS1 (the same in Tables 2 to 4, 6, and 7).

TABLE 1

| SURFACE | R | D | Nd | vd |
|---|---|---|---|---|
| OBJ | ∞ | 81.433 | | |
| 1 | ∞ | 0.509 | 1.5163 | 64.1 |
| 2 | ∞ | 0.020 | | |
| 3 | 0.430 | 0.197 | 1.6667 | 48.3 |
| 4 | −44.302 | 0.142 | | |
| 5 | −0.504 | 0.061 | 1.7618 | 26.5 |
| 6 | 0.390 | 0.028 | | |
| 7 | 2.957 | 0.202 | 1.7725 | 49.6 |
| 8 | −0.399 | 0.231 | | |
| 9 * | −0.707 | 0.306 | 1.6935 | 53.2 |
| 10 * | −0.441 | 0.260 | | |
| 11 | ∞ | 0.112 | 1.5163 | 64.1 |
| 12 | ∞ | | | |

ASPHERIC COEFFICIENT

| SURFACE | K | $A_4$ | $A_6$ |
|---|---|---|---|
| 9 | 1.0000 | −2.7002E+00 | −8.5065E+00 |
| 10 | 1.0000 | −7.7231E−01 | −2.1999E+00 |

| SURFACE | $A_8$ | $A_{10}$ |
|---|---|---|
| 9 | −3.1837E+02 | 1.7117E+03 |
| 10 | 2.2952E+01 | −1.7147E+02 |

* ASPHERIC SURFACE

Furthermore, the projection optical system according to Example 1 satisfies, as shown in Table 8, the conditional expressions (1), (2), (1'), (1"), and (2').

Example 2

Three-Element Configuration 1

Figure 2:
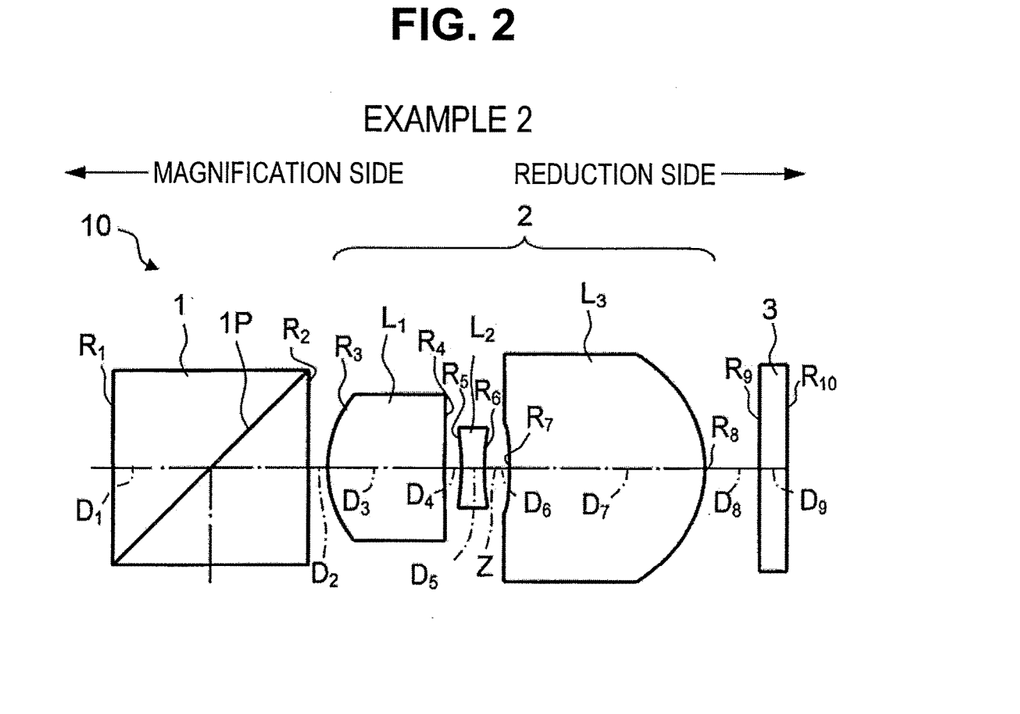
FIG. 2 is a diagram illustrating a configuration of a projection optical system according to Example 2 of the invention.

As shown in FIG. 2, a projection optical system according to Example 2 includes, in order from the magnification side: a first lens $L_1$ formed of a PBS 1 and a positive meniscus lens which has a convex surface facing toward the magnification side; a second lens $L_2$ formed as a biconcave lens; a third lens $L_3$ formed as a bi-aspheric lens having a positive meniscus shape which has a convex surface facing toward the reduction side on the optical axis Z; and a LCOS 3. Furthermore, the three lenses $L_1$ to $L_3$ constitute a projection lens 2 (the same in the following Examples 3 to 5).

With such a configuration according to the example, it is possible to embody an optical system capable of achieving both compactness and high performance.

Furthermore, the aspheric shapes of the both surfaces of the third lens $L_3$ are defined by the above-mentioned aspheric surface expression.

The upper part of Table 2 shows the radius of curvatures R of the lens surfaces of the projection lens system according to Example 2, the on-axis surface spacings D, the refractive indices Nd of the lenses at the d-line, and the Abbe numbers vd of the lenses at the d-line. Furthermore, the lower part of Table 2 shows the aspheric surface coefficients representing the aspheric surfaces.

TABLE 2

| SUR-FACE | R | D | Nd | vd |
|---|---|---|---|---|
| OBJ | ∞ | 88.948 | | |
| 1 | ∞ | 0.556 | 1.5163 | 64.1 |
| 2 | ∞ | 0.056 | | |
| 3 | 0.330 | 0.329 | 1.6667 | 48.3 |
| 4 | 3.195 | 0.049 | | |
| 5 | −0.704 | 0.067 | 1.7847 | 25.7 |
| 6 | 0.631 | 0.072 | | |
| 7 * | −2.245 | 0.560 | 1.6935 | 53.2 |
| 8 * | −0.367 | 0.155 | | |
| 9 | ∞ | 0.078 | 1.5163 | 64.1 |
| 10 | ∞ | | | |

ASPHERIC COEFFICIENT

| SURFACE | K | $A_3$ | $A_4$ | $A_5$ |
|---|---|---|---|---|
| 7 | 1.0000 | 0.0000E+00 | −3.2076E+02 | 1.2092E+04 |
| 8 | 1.0000 | 0.0000E+00 | −2.4130E+01 | 3.9035E+02 |

| SURFACE | $A_6$ | $A_7$ | $A_8$ | $A_9$ |
|---|---|---|---|---|
| 7 | −2.1134E+05 | 1.8970E+06 | −8.5928E+06 | 1.5325E+07 |
| 8 | −2.4446E+03 | 5.2613E+03 | 9.2433E+03 | −5.7719E+04 |

| SURFACE | $A_{10}$ | $A_{11}$ | $A_{12}$ |
|---|---|---|---|
| 7 | −1.8095E+05 | 0.0000E+00 | 0.0000E+00 |
| 8 | 6.9011E+04 | 0.0000E+00 | 0.0000E+00 |

* ASPHERIC SURFACE

Furthermore, the projection optical system according to Example 2 satisfies, as shown in Table 8, the conditional expressions (1), (2), (1'), (1"), and (2').

Example 3

Three-Element Configuration 2

Figure 3:
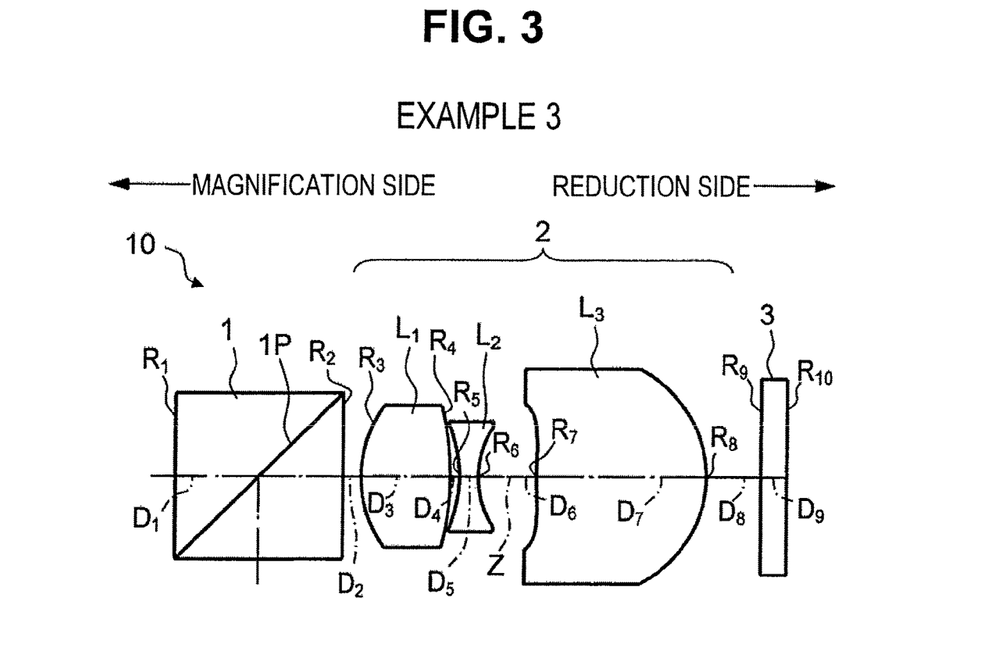
FIG. 3 is a diagram illustrating a configuration of a projection optical system according to Example 3 of the invention.

As shown in FIG. 3, the configuration of a projection optical system according to Example 3 is substantially the same as that according to Example 2. However, the main difference of the present configuration is that the first lens $L_1$ is formed as a biconvex lens, the second lens $L_2$ is formed as a bi-aspheric lens having a biconcave shape, and the third lens $L_3$ is formed as a bi-aspheric lens having a biconvex shape on the optical axis Z.

With such a configuration according to the example, it is possible to embody an optical system capable of achieving both compactness and high performance.

Furthermore, the aspheric shapes of the both surfaces of each of the second lens $L_2$ and the third lens $L_3$ are defined by the above-mentioned aspheric surface expression.

The upper part of Table 3 shows the radius of curvatures R of the lens surfaces of the projection lens system according to Example 3, the on-axis surface spacings D, the refractive indices Nd of the lenses at the d-line, and the Abbe numbers vd of the lenses at the d-line. Furthermore, the lower part of Table 3 shows the aspheric surface coefficients representing the aspheric surfaces.

TABLE 3

| SUR-FACE | R | D | Nd | vd |
|---|---|---|---|---|
| OBJ | ∞ | 92.448 | | |
| 1 | ∞ | 0.489 | 1.7725 | 49.6 |
| 2 | ∞ | 0.054 | | |
| 3 | 0.358 | 0.262 | 1.7725 | 49.6 |
| 4 | −0.830 | 0.027 | | |
| 5 * | −0.356 | 0.054 | 1.6030 | 28.4 |
| 6 * | 0.287 | 0.171 | | |
| 7 * | 2.103 | 0.495 | 1.4910 | 57.6 |

TABLE 3-continued

| | | | | |
|---|---|---|---|---|
| 8 * | −0.353 | 0.158 | | |
| 9 | ∞ | 0.076 | 1.5163 | 64.1 |
| 10 | ∞ | | | |

ASPHERIC COEFFICIENT

| SUR-FACE | K | $A_3$ | $A_4$ | $A_5$ |
|---|---|---|---|---|
| 5 | 1.0000 | 0.0000E+00 | 9.2955E+00 | 0.0000E+00 |
| 6 | 1.0000 | 0.0000E+00 | 4.1338E+00 | 0.0000E+00 |
| 7 | 1.0000 | 0.0000E+00 | −8.1824E+01 | 2.0885E+03 |
| 8 | 1.0000 | 0.0000E+00 | −2.8981E+01 | 5.1991E+02 |

| SUR-FACE | $A_6$ | $A_7$ | $A_8$ | $A_9$ |
|---|---|---|---|---|
| 5 | −4.3208E+01 | 0.0000E+00 | 6.1339E+02 | 0.0000E+00 |
| 6 | 2.4159E+02 | 0.0000E+00 | 2.6738E+03 | 0.0000E+00 |
| 7 | −2.6514E+04 | 1.7283E+05 | −5.7642E+05 | 8.1188E+05 |
| 8 | −3.4630E+03 | 7.8392E+03 | 1.3016E+04 | −8.5824E+04 |

| SUR-FACE | $A_{10}$ | $A_{11}$ | $A_{12}$ |
|---|---|---|---|
| 5 | 0.0000E+00 | 0.0000E+00 | 0.0000E+00 |
| 6 | 0.0000E+00 | 0.0000E+00 | 0.0000E+00 |
| 7 | −2.2103E+05 | 0.0000E+00 | 0.0000E+00 |
| 8 | 1.0432E+05 | 0.0000E+00 | 0.0000E+00 |

* ASPHERIC SURFACE

Furthermore, the projection optical system according to Example 3 satisfies, as shown in Table 8, the conditional expressions (1), (2), (1'), (1"), and (2').

Example 4

Three-Element Configuration 3

Figure 4:
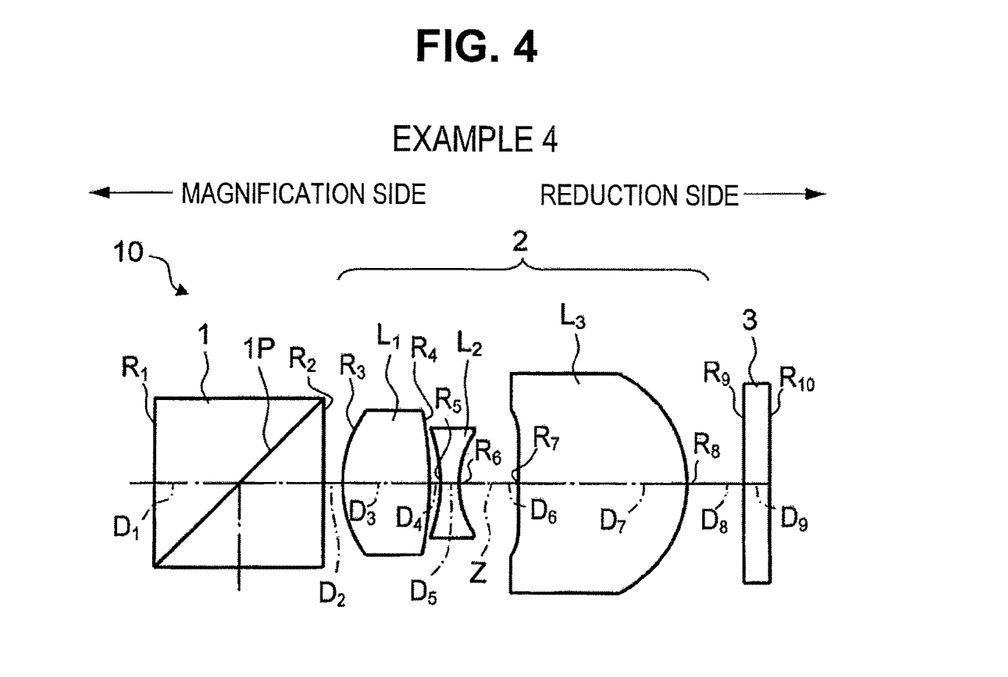
FIG. 4 is a diagram illustrating a configuration of a projection optical system according to Example 4 of the invention.

As shown in FIG. 4, the configuration of a projection optical system according to Example 4 is substantially the same as that according to Example 3.

With such a configuration according to the example, it is possible to embody an optical system capable of achieving both compactness and high performance.

Furthermore, the aspheric shapes of the both surfaces of each of the second lens $L_2$ and the third lens $L_3$ are defined by the above-mentioned aspheric surface expression.

The upper part of Table 4 shows the radius of curvatures R of the lens surfaces of the projection lens system according to Example 4, the on-axis surface spacings D, the refractive indices Nd of the lenses at the d-line, and the Abbe numbers vd of the lenses at the d-line. Furthermore, the lower part of Table 4 shows the aspheric surface coefficients representing the aspheric surfaces.

TABLE 4

| SUR-FACE | R | D | Nd | vd |
|---|---|---|---|---|
| OBJ | ∞ | 92.835 | | |
| 1 | ∞ | 0.491 | 1.7725 | 49.6 |
| 2 | ∞ | 0.055 | | |
| 3 | 0.351 | 0.255 | 1.7725 | 49.6 |
| 4 | −1.046 | 0.031 | | |
| 5 * | −0.406 | 0.055 | 1.6340 | 23.9 |
| 6 * | 0.291 | 0.172 | | |
| 7 * | 1.635 | 0.492 | 1.4910 | 57.6 |
| 8 * | −0.355 | 0.164 | | |
| 9 | ∞ | 0.076 | 1.5163 | 64.1 |
| 10 | ∞ | | | |

TABLE 4-continued

ASPHERIC COEFFICIENT

| SUR-FACE | K | $A_3$ | $A_4$ | $A_5$ |
|---|---|---|---|---|
| 5 | 1.0000 | 0.0000E+00 | 7.9777E+00 | 0.0000E+00 |
| 6 | 1.0000 | 0.0000E+00 | 5.4765E+00 | 0.0000E+00 |
| 7 | 1.0000 | 0.0000E+00 | −8.1183E+01 | 2.0649E+03 |
| 8 | 1.0000 | 0.0000E+00 | −2.8621E+01 | 5.1128E+02 |

| SUR-FACE | $A_6$ | $A_7$ | $A_8$ | $A_9$ |
|---|---|---|---|---|
| 5 | −6.3978E+01 | 0.0000E+00 | 7.1222E+02 | 0.0000E+00 |
| 6 | 2.3575E+02 | 0.0000E+00 | 2.9524E+03 | 0.0000E+00 |
| 7 | −2.5926E+04 | 1.6823E+05 | −5.6249E+05 | 8.0402E+05 |
| 8 | −3.3913E+03 | 7.6449E+03 | 1.2641E+04 | −8.3000E+04 |

| SUR-FACE | $A_{10}$ | $A_{11}$ | $A_{12}$ |
|---|---|---|---|
| 5 | 0.0000E+00 | 0.0000E+00 | 0.0000E+00 |
| 6 | 0.0000E+00 | 0.0000E+00 | 0.0000E+00 |
| 7 | −2.1287E+05 | 0.0000E+00 | 0.0000E+00 |
| 8 | 1.0046E+05 | 0.0000E+00 | 0.0000E+00 |

* ASPHERIC SURFACE

Furthermore, the projection optical system according to Example 4 satisfies, as shown in Table 8, the conditional expressions (1), (2), (1'), (1"), and (2').

Example 5

Three-Element Configuration 4

Figure 5:
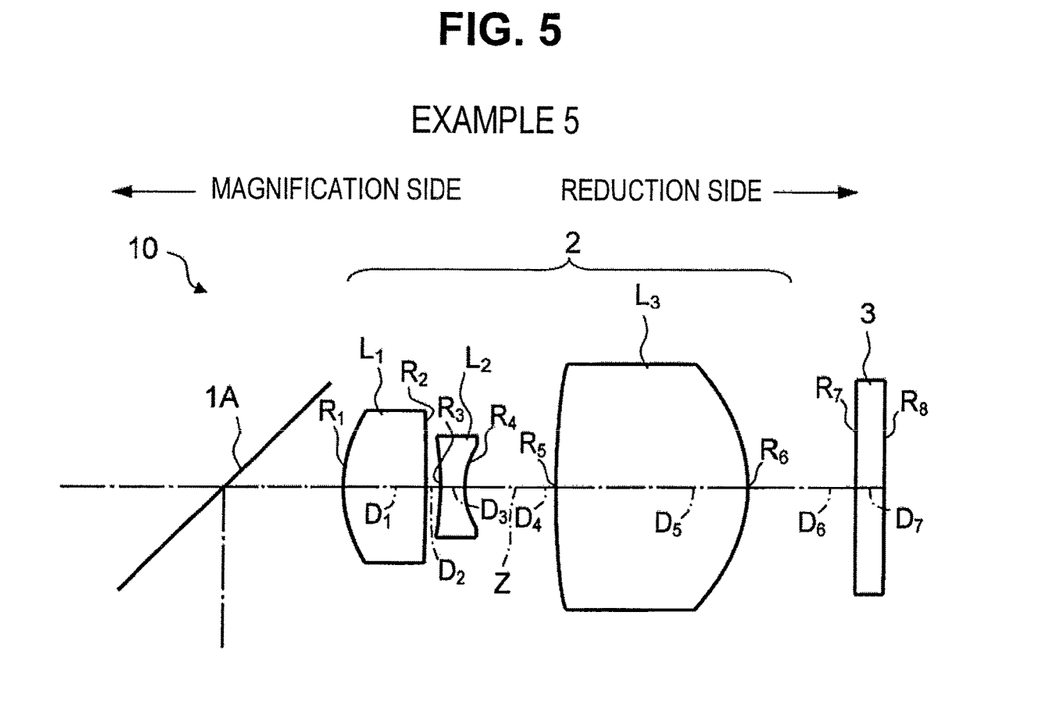
FIG. 5 is a diagram illustrating a configuration of a projection optical system according to Example 5 of the invention.

As shown in FIG. 5, the configuration of a projection optical system according to Example 5 is substantially the same as that according to Example 3 or 4. However, the main difference of the present configuration is that the polarization separation mirror 1A is used as a polarized light separation section, the second lens $L_2$ is formed as a spherical surface lens, and the third lens $L_3$ is formed as a bi-aspheric lens having a biconvex shape not only on the optical axis Z but also throughout the entire lens.

With such a configuration according to the example, it is possible to embody an optical system capable of achieving both compactness and high performance.

Furthermore, the aspheric shapes of the both surfaces of the third lens $L_3$ are defined by the above-mentioned aspheric surface expression.

The upper part of Table 5 shows the radius of curvatures R of the lens surfaces of the projection lens system according to Example 5, the on-axis surface spacings D, the refractive indices Nd of the lenses at the d-line, and the Abbe numbers vd of the lenses at the d-line. Further, the surface numbers 1 and 2 of Table 5 represents the both surface of the first lens $L_1$. Furthermore, the lower part of Table 5 shows the aspheric surface coefficients representing the aspheric surfaces.

TABLE 5

| SURFACE | R | D | Nd | vd |
|---|---|---|---|---|
| OBJ | ∞ | 93.973 | | |
| 1 | 0.419 | 0.234 | 1.8000 | 38.8 |
| 2 | −6.141 | 0.042 | | |
| 3 | −0.868 | 0.070 | 1.4900 | 56.9 |
| 4 | 0.220 | 0.263 | | |
| 5 * | 2.132 | 0.555 | 1.6768 | 57.7 |

TABLE 5-continued

| | | | | |
|---|---|---|---|---|
| 6 * | −0.452 | 0.306 | | |
| 7 | ∞ | 0.082 | 1.5163 | 64.1 |
| 8 | ∞ | | | |

ASPHERIC COEFFICIENT

| SURFACE | K | $A_4$ | $A_6$ |
|---|---|---|---|
| 5 | 1.0000 | −1.3313E+01 | 1.8078E+01 |
| 6 | 1.0000 | 6.3192E−01 | 2.6294E+00 |

| SURFACE | $A_8$ | $A_{10}$ |
|---|---|---|
| 5 | −1.1145E+02 | 4.9642E+02 |
| 6 | 2.1774E+01 | 4.8744E+01 |

* ASPHERIC SURFACE

Furthermore, the projection optical system according to Example 5 satisfies, as shown in Table 8, the conditional expressions (1), (2), (1'), (1''), and (2').

Example 6

Two-Element Configuration 1

Figure 6:
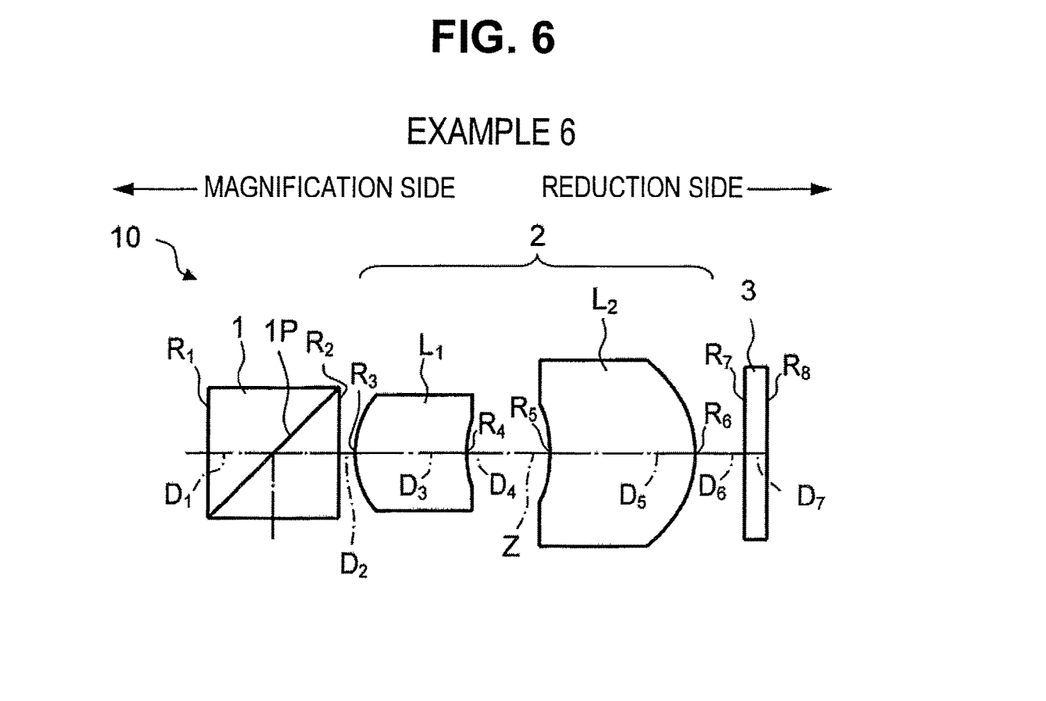
FIG. 6 is a diagram illustrating a configuration of a projection optical system according to Example 6 of the invention.

As shown in FIG. 6, a projection optical system according to Example 6 includes, in order from the magnification side: a first lens $L_1$ formed of a PBS 1 and a bi-aspheric lens having a meniscus shape which has a convex surface facing toward the magnification side overall; a second lens $L_2$ formed as a bi-aspheric lens having a positive meniscus shape which has a convex surface facing toward the reduction side overall; and a LCOS 3. Furthermore, the two lenses $L_1$ and $L_2$ constitute a projection lens 2 (the same in the following Example 7).

With such a configuration according to the example, it is possible to embody a further compact optical system.

Furthermore, the aspheric shapes of the both surfaces of the first lens $L_1$ and second lens $L_2$ are defined by the above-mentioned aspheric surface expression.

The upper part of Table 6 shows the radius of curvatures R of the lens surfaces of the projection lens system according to Example 6, the on-axis surface spacings D, the refractive indices Nd of the lenses at the d-line, and the Abbe numbers vd of the lenses at the d-line. Furthermore, the lower part of Table 6 shows the aspheric surface coefficients representing the aspheric surfaces.

TABLE 6

| SURFACE | R | D | Nd | vd |
|---|---|---|---|---|
| OBJ | ∞ | 93.050 | | |
| 1 | ∞ | 0.372 | 1.7725 | 49.6 |
| 2 | ∞ | 0.047 | | |
| 3 * | 0.252 | 0.317 | 1.4910 | 57.6 |
| 4 * | 0.343 | 0.238 | | |
| 5 * | −0.439 | 0.419 | 1.6935 | 53.2 |
| 6 * | −0.301 | 0.140 | | |
| 7 | ∞ | 0.065 | 1.5163 | 64.1 |
| 8 | ∞ | | | |

ASPHERIC COEFFICIENT

| SURFACE | K | $A_3$ | $A_4$ | $A_5$ |
|---|---|---|---|---|
| 3 | 1.0000 | 0.0000E+00 | −1.1970E+00 | 0.0000E+00 |
| 4 | 1.0000 | 0.0000E+00 | 1.4854E+01 | 0.0000E+00 |
| 5 | 1.0000 | 0.0000E+00 | −8.9033E+01 | 2.8289E+03 |
| 6 | 1.0000 | 0.0000E+00 | −2.9011E+01 | 7.0284E+02 |

TABLE 6-continued

| SURFACE | $A_6$ | $A_7$ | $A_8$ | $A_9$ |
|---|---|---|---|---|
| 3 | 7.5317E+00 | 0.0000E+00 | −7.1864E+02 | 0.0000E+00 |
| 4 | 9.0112E+02 | 0.0000E+00 | 1.9374E+03 | 0.0000E+00 |
| 5 | −4.9693E+04 | 4.6202E+05 | −2.2547E+06 | 4.6257E+06 |
| 6 | −5.7191E+03 | 1.5595E+04 | 3.3225E+04 | −2.5999E+05 |

| SURFACE | $A_{10}$ | $A_{11}$ | $A_{12}$ |
|---|---|---|---|
| 3 | 0.0000E+00 | 0.0000E+00 | 0.0000E+00 |
| 4 | 0.0000E+00 | 0.0000E+00 | 0.0000E+00 |
| 5 | −9.0158E+05 | 0.0000E+00 | 0.0000E+00 |
| 6 | 3.8752E+05 | 0.0000E+00 | 0.0000E+00 |

* ASPHERIC SURFACE

Furthermore, the projection optical system according to Example 6 satisfies, as shown in Table 8, the conditional expressions (1), (2), (1'), (1''), and (2').

Example 7

Two-Element Configuration 2

Figure 7:
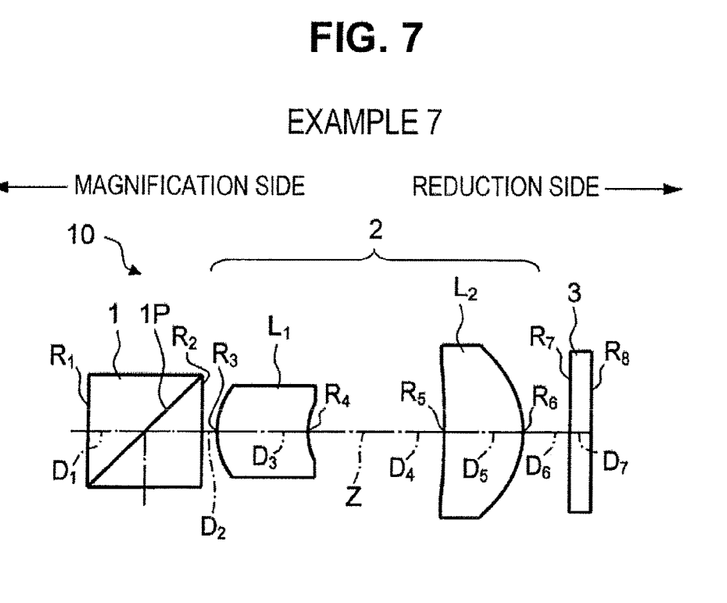
FIG. 7 is a diagram illustrating a configuration of a projection optical system according to Example 7 of the invention.
Figure 8:
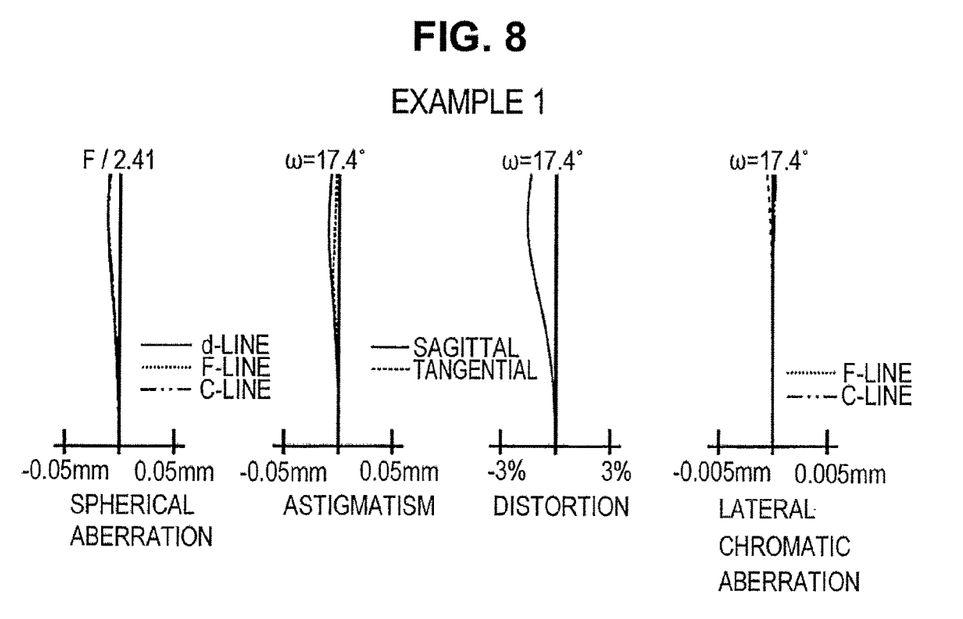
FIG. 8 is a diagram illustrating various aberrations of the projection optical system according to Example 1.
Figure 9:
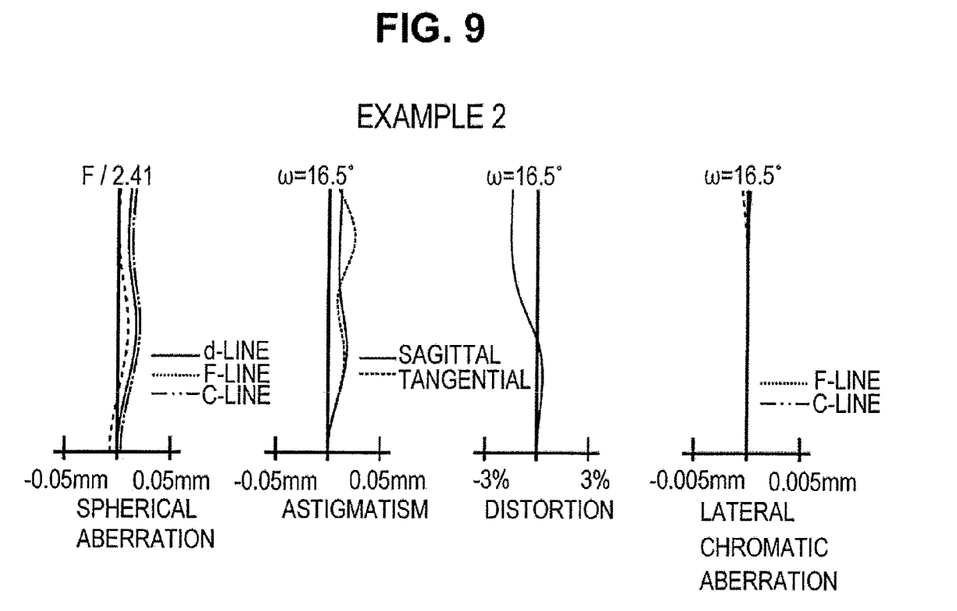
FIG. 9 is a diagram illustrating various aberrations of the projection optical system according to Example 2.
Figure 10:
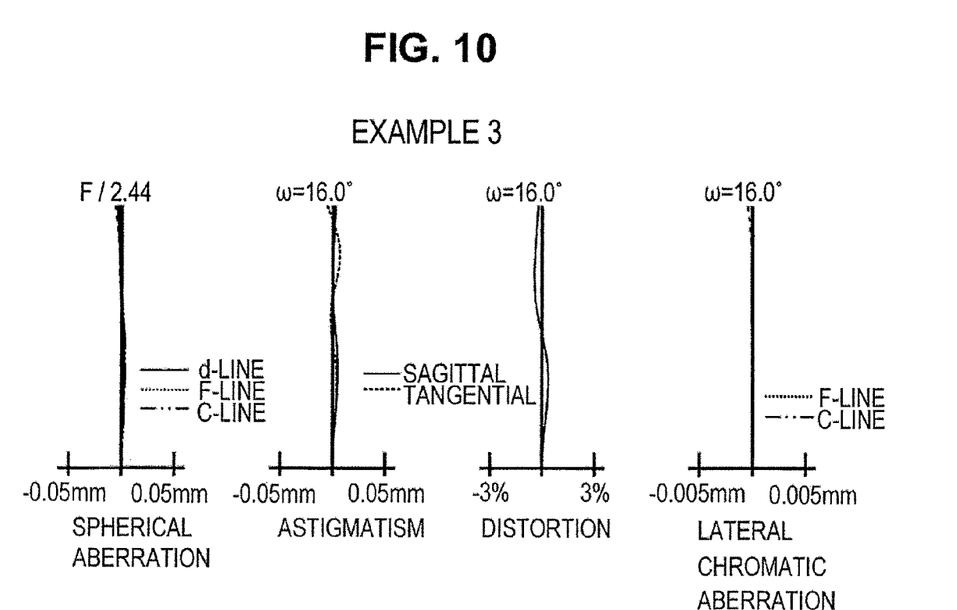
FIG. 10 is a diagram illustrating various aberrations of the projection optical system according to Example 3.
Figure 11:
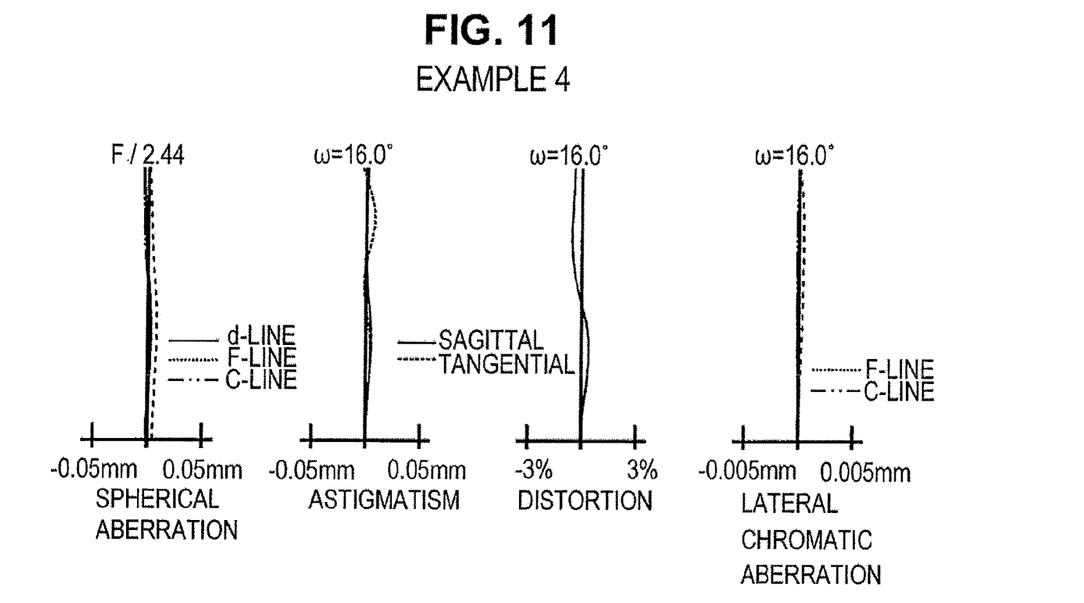
FIG. 11 is a diagram illustrating various aberrations of the projection optical system according to Example 4.
Figure 12:
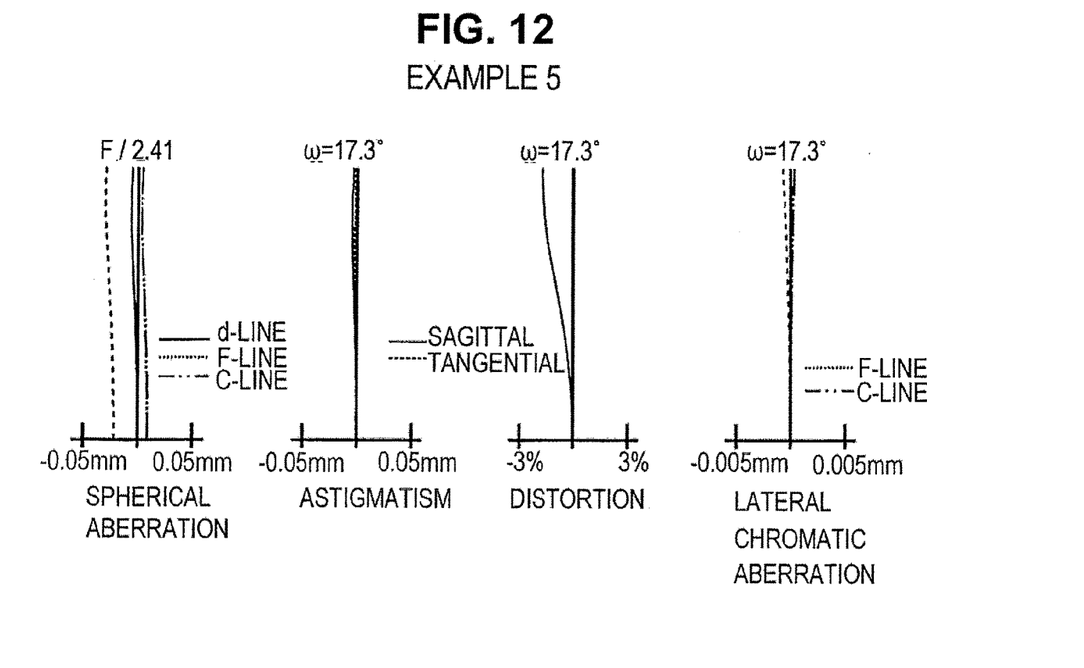
FIG. 12 is a diagram illustrating various aberrations of the projection optical system according to Example 5.
Figure 13:
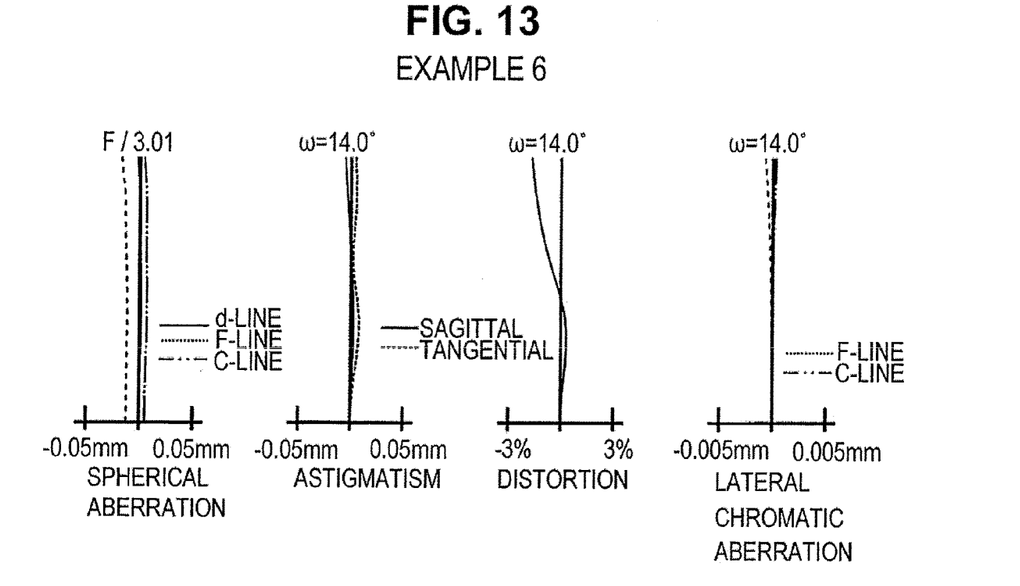
FIG. 13 is a diagram illustrating various aberrations of the projection optical system according to Example 6.
Figure 14:
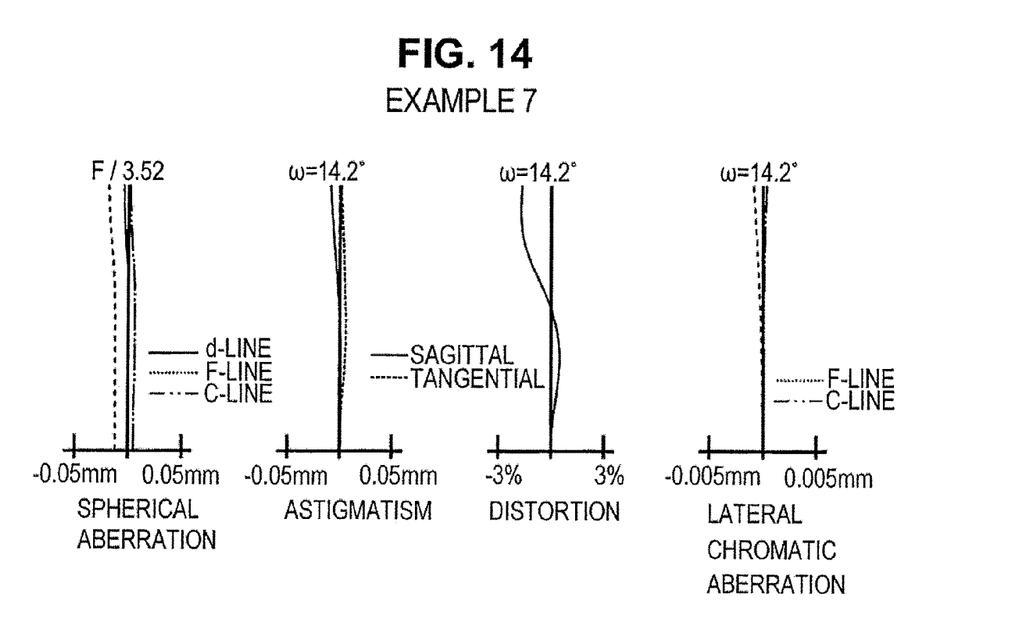
FIG. 14 is a diagram illustrating various aberrations of the projection optical system according to Example 7.

As shown in FIG. 7, the configuration of a projection optical system according to Example 7 is substantially the same as that according to Example 6.

With such a configuration according to the example, it is possible to embody a further compact optical system.

Furthermore, the aspheric shapes of the both surfaces of the first lens $L_1$ and second lens $L_2$ are defined by the above-mentioned aspheric surface expression.

The upper part of Table 7 shows the radius of curvatures R of the lens surfaces of the projection lens system according to Example 7, the on-axis surface spacings D, the refractive indices Nd of the lenses at the d-line, and the Abbe numbers vd of the lenses at the d-line. Furthermore, the lower part of Table 7 shows the aspheric surface coefficients representing the aspheric surfaces.

TABLE 7

| SURFACE | R | D | Nd | vd |
|---|---|---|---|---|
| OBJ | ∞ | 94.516 | | |
| 1 | ∞ | 0.350 | 1.7725 | 49.6 |
| 2 | ∞ | 0.047 | | |
| 3 * | 0.235 | 0.284 | 1.4910 | 57.6 |
| 4 * | 0.216 | 0.420 | | |
| 5 * | −5.921 | 0.244 | 1.4910 | 57.6 |
| 6 * | −0.302 | 0.144 | | |
| 7 | ∞ | 0.066 | 1.5163 | 64.1 |
| 8 | ∞ | | | |

ASPHERIC COEFFICIENT

| SURFACE | K | $A_3$ | $A_4$ | $A_5$ |
|---|---|---|---|---|
| 3 | 1.0000 | 0.0000E+00 | 5.4419E+00 | −9.6769E+01 |
| 4 | 1.0000 | 0.0000E+00 | 3.7770E+01 | 3.7578E+02 |
| 5 | 1.0000 | 0.0000E+00 | −5.7180E+01 | 1.4616E+03 |
| 6 | 1.0000 | 0.0000E+00 | −3.1269E+01 | 7.2421E+02 |

| SURFACE | $A_6$ | $A_7$ | $A_8$ | $A_9$ |
|---|---|---|---|---|
| 3 | 3.9447E+02 | 3.1801E+02 | −2.6516E+03 | −8.4628E+03 |
| 4 | −1.4389E+04 | 8.7280E+04 | 8.9046E+05 | −7.2305E+06 |
| 5 | −1.7364E+04 | 1.1300E+05 | −4.2516E+05 | 8.8331E+05 |
| 6 | −5.4986E+03 | 1.3675E+04 | 3.1105E+04 | −2.2210E+05 |

TABLE 7-continued

| SURFACE | $A_{10}$ | $A_{11}$ | $A_{12}$ |
|---|---|---|---|
| 3 | −2.4370E+04 | 0.0000E+00 | 0.0000E+00 |
| 4 | −1.3024E+01 | 0.0000E+00 | 0.0000E+00 |
| 5 | −7.8461E+05 | 0.0000E+00 | 0.0000E+00 |
| 6 | 3.2725E+05 | 0.0000E+00 | 0.0000E+00 |

*ASPHERIC SURFACE

Furthermore, the projection optical system according to Example 7 satisfies, as shown in Table 8, the conditional expressions (1), (2), (1'), (1"), and (2').

Furthermore, FIGS. 8 to 14 are aberration diagram illustrating various aberrations (spherical aberration, astigmatism, distortion, and lateral chromatic aberration) of the projection optical system according to Examples 1 to 7. In each aberration diagram, ω represents a half angle of view. The diagrams of spherical aberration show aberration curves of the d-line, the F-line, and the C-line, and the diagrams of lateral chromatic aberration show aberration curves of the F-line (the dotted line: hereinafter the same) and the C-line (chain double-dashed line: hereinafter the same) relative to the d-line. As shown in FIGS. 8 to 14, in the projection optical system according to Examples 1 to 7, the aberrations including distortion and lateral chromatic aberration are satisfactorily corrected.

TABLE 8

| | CONDITIONAL EXPRESSIONS (1), (1'), (1") | CONDITIONAL EXPRESSIONS (2), (2') |
|---|---|---|
| EXAMPLE 1 | 0.11 | 0.33 |
| EXAMPLE 2 | 0.12 | 0.21 |
| EXAMPLE 3 | −0.13 | 0.21 |
| EXAMPLE 4 | −0.12 | 0.21 |
| EXAMPLE 5 | 0.26 | 0.36 |
| EXAMPLE 6 | 0.29 | 0.18 |
| EXAMPLE 7 | 0.19 | 0.19 |

Further, the projection optical system according to the embodiment of the invention is not limited to the examples mentioned above, and may be modified into various forms. For example, it may be possible to properly modify the radius of curvatures R of the lenses and the on-axis surface spacings (or the lens thickness) D.

Furthermore, the projection-type display apparatus according to the invention is not limited to the configurations mentioned above, and may be modified to various forms of apparatuses having the projection optical system according to the invention. As the light valve, instead of the reflective liquid crystal display device (LCOS), any reflective-type light valve may be used. For example, it may be possible to use a micro mirror element (for example, a digital micro mirror device manufactured by Texas Instruments Co.) in which a plurality of inclinable micro mirrors are formed on a substantially flat surface. As the illumination optical system, it may be possible to employ a proper configuration corresponding to types of the light valves.

Further, even when a mirror and the like are disposed in the optical path between the above-mentioned polarized light separation surface and reflective liquid crystal display device, this configuration may have practically the same effect as that of the embodiment. In this case, it may be said that this configuration is included in the embodiment.

Furthermore, in the embodiment, the polarized light separation section is configured to separate both optical paths by reflecting the illumination light and transmitting the modulated light. However, the optical paths may be separated by transmitting the illumination light and reflecting the modulated light.

Further, it is preferable that the number of the lenses constituting the projection lens should be four or fewer. However, as might be expected, the invention may be applied to the configuration in which the number of lenses is set to be five or more.

Furthermore, as an illuminator of the light source section, it may be possible to use another illuminator such as a semiconductor laser, and by using the illuminator, it is possible to achieve compactness of the apparatus. As might be expected, it may be possible to use a different type laser or a different type light source.

Further, the illumination light may be the linearly polarized light when being emitted from the light source. In addition, as shown in FIG. 15, the light may be converted into the linearly polarized light after being emitted from the light source.

What is claimed is:

1. A projection optical system comprising, in order:
a reflective light valve that modulates incident illumination light in response to an input image signal and reflects and emits the modulated light;
a projection lens that transmits the illumination light incident to the reflective light valve and the modulated light emitted from the reflective light valve and is formed to be telecentric on a reduction side; and
a polarized light separation section that separates an optical path of the illumination light incident to the projection lens from an optical path of the modulated light emitted from the projection lens,
wherein all lenses included in the projection lens are arranged between the reflective light valve and the polarized light separation section.

2. The projection optical system according to claim 1, wherein the projection lens satisfies the following conditional expression (1):

$$-1.0 < FF/f < 1.0 \tag{1}$$

where
FF is a focal position of the projection lens on a magnification side when a vertex of a magnification side surface of a lens closest to the magnification side of the projection lens is defined as a point of origin and a direction toward the reduction side is defined as a positive direction, and
f is a focal length of the projection lens.

3. The projection optical system according to claim 1, wherein the number of the reflective light valve is one, and the following conditional expression (2) is further satisfied:

$$Bf/f < 0.8 \tag{2}$$

where
Bf is a back focal length of the projection lens on the reduction side, and
f is a focal length of the projection lens.

4. The projection optical system according to claim 1, wherein the projection lens is formed of four or fewer lenses.

5. The projection optical system according to claim 4, where at least one surface of a lens, which is disposed to be closest to the reduction side of the projections lens, is formed to be aspheric.

6. The projection optical system according to claim 1, wherein a maximum value of a diameter of effective rays among rays, which are transmitted through each lens constituting the projection lens, in a direction perpendicular to an optical axis is 15 mm or less.

7. A projection-type display apparatus comprising:
the projection optical system according to claim 1; and
an illumination optical system that emits illumination light and uniformizes a light amount of the illumination light.

* * * * *